United States Patent
Garton et al.

(10) Patent No.: US 9,474,206 B2
(45) Date of Patent: Oct. 25, 2016

(54) CHASSIS AUGMENTATION FOR AGRICULTURAL VEHICLES

(71) Applicant: DEERE & COMPANY, Moline, IL (US)

(72) Inventors: Michael S. Garton, Ankeny, IA (US); Daniel A. Krieg, Pleasant Hill, IA (US); Chirag Sheth, Ahmedabad (IN); Scott D. Weber, Bondurant, IA (US); Barrett D. Reed, Pella, IA (US)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 14/532,540

(22) Filed: Nov. 4, 2014

(65) Prior Publication Data

US 2016/0120093 A1    May 5, 2016

(51) Int. Cl.
  *B62D 21/18*   (2006.01)
  *A01D 41/00*   (2006.01)
  *A01D 67/00*   (2006.01)

(52) U.S. Cl.
  CPC .............. *A01D 41/00* (2013.01); *A01D 67/00* (2013.01); *B62D 21/186* (2013.01)

(58) Field of Classification Search
  CPC .... A01B 51/026; B62D 21/02; B62D 21/04; B62D 21/14
  USPC ................................ 296/204, 29, 30, 193.07
  See application file for complete search history.

(56) References Cited

U.S. PATENT DOCUMENTS

| 3,237,701 | A | * | 3/1966 | Morkoski | ............... | A01B 35/10 |
| | | | | | | 172/451 |
| 3,908,774 | A | * | 9/1975 | Bobard | ................ | A01B 51/026 |
| | | | | | | 180/14.1 |
| 6,454,294 | B1 | * | 9/2002 | Bittner | ................. | A01B 51/026 |
| | | | | | | 180/68.4 |
| 7,487,843 | B2 | * | 2/2009 | Tuttle | ................... | A01B 59/062 |
| | | | | | | 172/272 |
| 2009/0242302 | A1 | * | 10/2009 | Fujiki | ................... | A01B 51/026 |
| | | | | | | 180/89.12 |

OTHER PUBLICATIONS

Cobb Adjustable Rear Sway Bar Mount, http://www.oakos.com/Merchant2/merchant.mvc?Screen=PROD&Store_Code=355&Product_Code=COB913275&Category_Code, Admitted Prior Art.
Tuner Motorsport Adjustable Front Sway Bar End Links, http://www.turnermotorsport.com/p-3849-e28-e30-e34-e36-e39-e46-e9x-mz3-z4-turner-motorsport-adjustable-front-sway-bar-end-links-pair.aspx, Admitted Prior Art.

* cited by examiner

*Primary Examiner* — Jason S Morrow
*Assistant Examiner* — E Turner Hicks
(74) *Attorney, Agent, or Firm* — Lorenz & Kopf, LLP

(57) ABSTRACT

A chassis augmentation assembly for, and an agricultural vehicle with, a chassis having a main frame supporting front and rear axles has longitudinally spaced chassis mounts attached to the vehicle and a beam assembly having at least one structural beam segment vertically spaced from the main frame. The beam assembly has longitudinally spaced ends coupled to the vehicle chassis via the chassis mounts. The beam assembly is configured to transfer longitudinal forces between the chassis mounts through the one or more structural beam segments.

20 Claims, 7 Drawing Sheets

CHASSIS AUGMENTATION FOR AGRICULTURAL VEHICLES

CROSS-REFERENCE TO RELATED APPLICATION(S)

Not Applicable.

STATEMENT OF FEDERALLY SPONSORED RESEARCH OR DEVELOPMENT

Not applicable.

FIELD OF THE DISCLOSURE

This disclosure relates generally to agricultural vehicles, and in particular to augmenting the chasses of agricultural vehicles.

BACKGROUND OF THE DISCLOSURE

Agricultural vehicles come in various forms for cutting and harvesting crop material. Examples of modern agricultural vehicles include tractors, windrowers, and various dedicated harvesting machines (e.g., combine harvesters, cotton pickers, sugarcane harvesters, and the like). Often, agricultural vehicles are large-scale machines that carry and process large volumes of crop material while traveling over rugged off-road terrain. The loads carried on-board the vehicle as well as the loading to which the vehicle is subjected during operation require the vehicle to have a heavy-duty chassis.

Despite being of heavy-duty construction, the vehicle chassis will likely undergo significant bend-inducing loads during operation. Torsion loads can arise during operation, as can bend-inducing loads in the fore-aft direction (i.e., the longitudinal front-to-back dimension) of the vehicle. The fore-aft bend-inducing loads are often the result of rapid decelerations and accelerations of the vehicle as well as from driving the vehicle over sloped, terraced or otherwise uneven terrain.

As a result, the vehicle chassis may experience bending stresses during use. In particular, the chassis may be subjected to stresses from fore-aft bend-inducing loads in the areas between the front and rear axles. For example, in cotton pickers with a center-mounted engine compartment (i.e., located between the front and rear axles), such stresses may arise in the areas between the engine compartment and both the front and rear axles.

SUMMARY OF THE DISCLOSURE

An assembly for enhancing the structural integrity of an agricultural vehicle chassis is disclosed, such that stresses in the chassis due to longitudinal bending of the main frame between the axles are reduced.

According to one aspect, the disclosure provides a chassis augmentation assembly for an agricultural vehicle with a chassis having a main frame supporting a front axle and a rear axle spaced apart along a longitudinal centerline of the vehicle. The assembly may include first and second chassis mounts attached to the vehicle chassis and longitudinally spaced apart, and may include a beam assembly having at least one structural beam segment vertically spaced from the main frame. The beam assembly may have a first end and a second end spaced apart longitudinally such that the first end is coupled to the vehicle chassis via the first chassis mount and the second end is coupled to the vehicle chassis via the second chassis mount. The beam assembly is configured to transfer longitudinal forces between the first and second chassis mounts through the at least one structural beam segment.

According to another aspect, the disclosure provides an agricultural vehicle with a chassis having a main frame extending along or parallel to a longitudinal centerline of the vehicle and supporting a front axle and a rear axle spaced apart longitudinally along centerline from the front axle. First and second chassis mounts may be attached to the vehicle chassis so as to be longitudinally spaced apart. A beam assembly having at least one structural beam segment may be vertically spaced from the main frame. The beam assembly may have a first end and a second end spaced apart longitudinally such that the first end is coupled to the vehicle chassis via the first chassis mount and the second end is coupled to the vehicle chassis via the second chassis mount. The beam assembly is configured to transfer longitudinal forces between the first and second chassis mounts through the at least one structural beam segment.

According to yet another aspect of the disclosure, the chassis augmentation assembly may include a first chassis mount attached to the vehicle chassis proximate the front axle and a second chassis mount attached to the vehicle chassis proximate the rear axle. The assembly may also include a front beam segment coupled at a front end to the first chassis mount and a rear beam segment coupled at a rear end to the second chassis mount. The rear beam segment is structurally coupled at a front end to a rear end of the front beam segment so as to transfer longitudinal forces between the front and rear beam segments. At least one of the front and rear beam segments may have an adjustable overall length.

These and other features and advantages of the present disclosure will become clear to a person skilled in the art after reading the following detailed description and in consideration of the drawings.

BRIEF DESCRIPTION OF THE DRAWINGS

Like reference numerals in the drawings indicate like components, parts, or operations.

DETAILED DESCRIPTION

Figure 1:
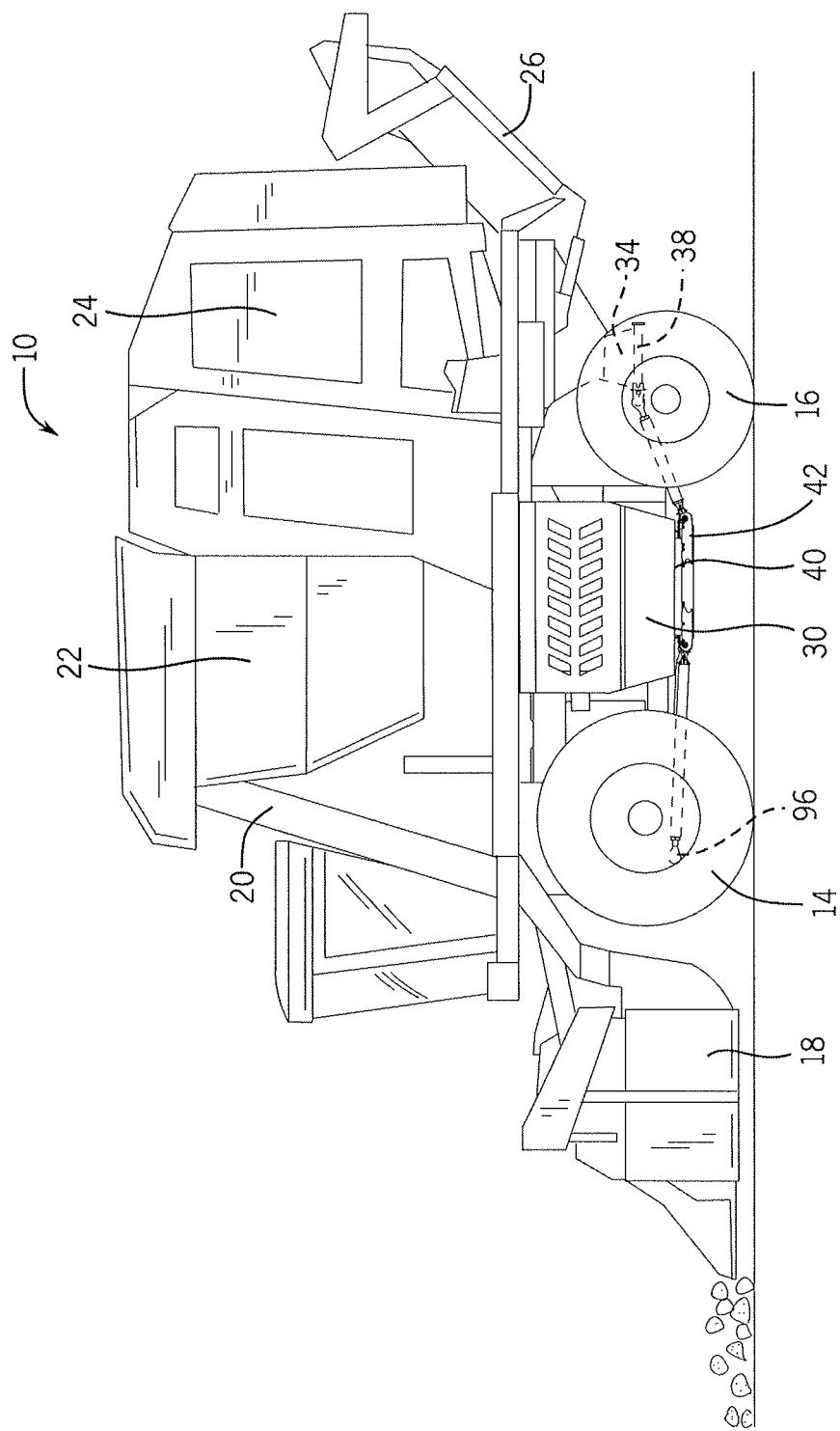
FIG. 1 is a side view of an example agricultural vehicle in the form of a cotton picker.

The following describes one or more example embodiments of the disclosed agricultural vehicle and chassis augmentation assembly, as shown in the accompanying figures of the drawings described briefly above. Various modifications to the example embodiments may be contemplated by one of skill in the art.

At the onset, it is noted that use of terms of orientation herein is for the purpose of convenience and clarity with respect to conventionally understood orientations of vehicle platforms. For example, the terms "fore" and "aft" and "front" and "rear" and "forward" and "rearward" are generally determined according to the normal forward direction of travel of the vehicle, and are used to describe a lengthwise or "longitudinal" direction. Similarly, directions perpendicular to the longitudinal direction, such as the "lateral" side-to-side or "left" and "right" directions are determined according a perspective facing the front of the vehicle from the rear, and the "transverse" or "up" and "down" or "vertical" directions are relative to the ground. A longitudinal centerline or central plane "A" (shown in FIG. 4) may extend through the lateral center of the vehicle along its length in the longitudinal direction.

Moving on, in certain situations it may be useful to provide additional rigidity to a vehicle chassis in order to bolster the chassis against bending forces realized during operation. Off-road work vehicles, such as agricultural vehicles, in particular may benefit from this due to the heavy fore-aft bend-inducing loads applied to the chassis in the off-road environment as the vehicle travels over sloped, terraced or otherwise uneven terrain. Further, fore-aft bend-inducing loads may also result from rapid decelerations and accelerations of the vehicle. As a result of this type of loading, the vehicle chassis may experience bending stresses during use. Stresses from fore-aft bend-inducing loads may occur in the areas between the front and rear axles due to the axles bending about the lateral center of the vehicle chassis. For example, in cotton pickers with a center-mounted engine compartment (i.e., located between the front and rear axles), such stresses may arise in the areas between the engine compartment and both the front and rear axles. To reduce these stresses, the vehicle chassis may be augmented by ancillary structural beam assembly.

The structural beam assembly may include one structural beam segment or a plurality of structural beam segments coupled to one another and connected at various load transfer points on the vehicle chassis, either above or below the chassis. The one or more beam segments are vertically displaced from the vehicle chassis between the load transfer points. Vertically spacing the beam segments from the chassis increases the effectiveness of the structural beam assembly to counter the fore-aft bend-inducing loads. Further, by connecting the one or more structural beam segments to the chassis, and possibly to each other, at movable connections, such as a pivotable joint, rather than rigid non-bending connections, bending moments may not be transferred from the beam segments to the chassis, but rather only compressive and tensile forces.

Each beam segment may be a rigid, structural body, such as a structural tube or channel member. In certain applications, the one or more beam segments may be a sub-assembly of the structural body and one or more adjustment mechanisms that allow for the movable connection of the beam segment or that can be used change the overall length dimension of the beam segment, or both. The adjustment mechanisms can be used to facilitate assembly and disassembly of the beam segments to the chassis and one another if multiple beam segments are coupled together. The adjustment mechanisms can also be used to take up slack, or extra length, out of the structural beam assembly so that proper rigidity and load transfer can be established. They can also be used to adjust the static pre-load of the assembly on the chassis. For example, pre-tensioning a beam segment by decreasing its overall length, or pre-compressing a beam segment by increasing its length, can be used to affect the characteristics of the loading applied to the chassis. The adjustment mechanisms can take any number of forms and configurations. For example, they could be in the form of a threaded eye bolt ball joint at one or both ends of the structural body, in which case the length adjustment is made by threading the eye bolts relative to the structural body. In one particular example, one eye bolt may have reverse threading, such that both eye bolts may be adjusted simultaneously (inward or outward to shorten or lengthen the beam segment sub-assembly) by relative rotation of the structural body. Various other mechanisms can be employed, however, such as pneumatic or hydraulic cylinders, shims, telescoping members, axial screws, staggered holes, cams, and so on.

The segmented nature of the structural beam assembly may also facilitate attachment to the agricultural vehicle in a manner that does not interfere with maintenance. For example, the structural beam assembly may be mounted to the chassis to extend along the longitudinal centerline of the vehicle, either above or below the chassis as space permits. When assembled the structural beam assembly may obstruct or reduce access to certain maintenance areas of the vehicle. However, by disassembling one or more beam segments, these maintenance areas can be accessed readily. Furthermore, by providing joints between beam segments and/or the chassis that can be decoupled and recoupled nondestructively, the structural beam assembly can be disassembled without being damaged, and one the necessary segments need be removed without uninstalling the entire assembly completely from the chassis.

Referring now to FIG. 1, an agricultural vehicle 10 is shown with its chassis augmented by a structural beam assembly according to this disclosure. FIG. 1 shows a self-propelled cotton harvester, in the form of a cotton picker, however, various other heavy-duty work vehicles could employ the disclosed assembly, including, for example, various off-road agricultural vehicles platforms, such as various tractors, windrowers and other forms of harvesters. In the illustrated cotton picker example, the agricultural vehicle 10 has a chassis 12 with a main frame and a front and rear axles, which support a pair of front drive wheels 14 and a pair of steerable rear wheels 16 that support the agricultural vehicle 10 off of the ground. Row units 18 may be attached at a header at the front of the vehicle for picking cotton bolls off of cotton plants. An air duct 20 may transfer the picked cotton bolls from the row units 18 to an accumulator 22, either before or after passing through a cleaning assembly. Cotton bolls may be stored in the accumulator 22 until they are transferred to a baler 24 where they are rolled into bales. After the cotton bale has reached a sufficient size, the bale may be wrapped in a protective material, and transferred through the rear gate 26 used to hold the bale until it is ready to be ejected.

Figure 2:
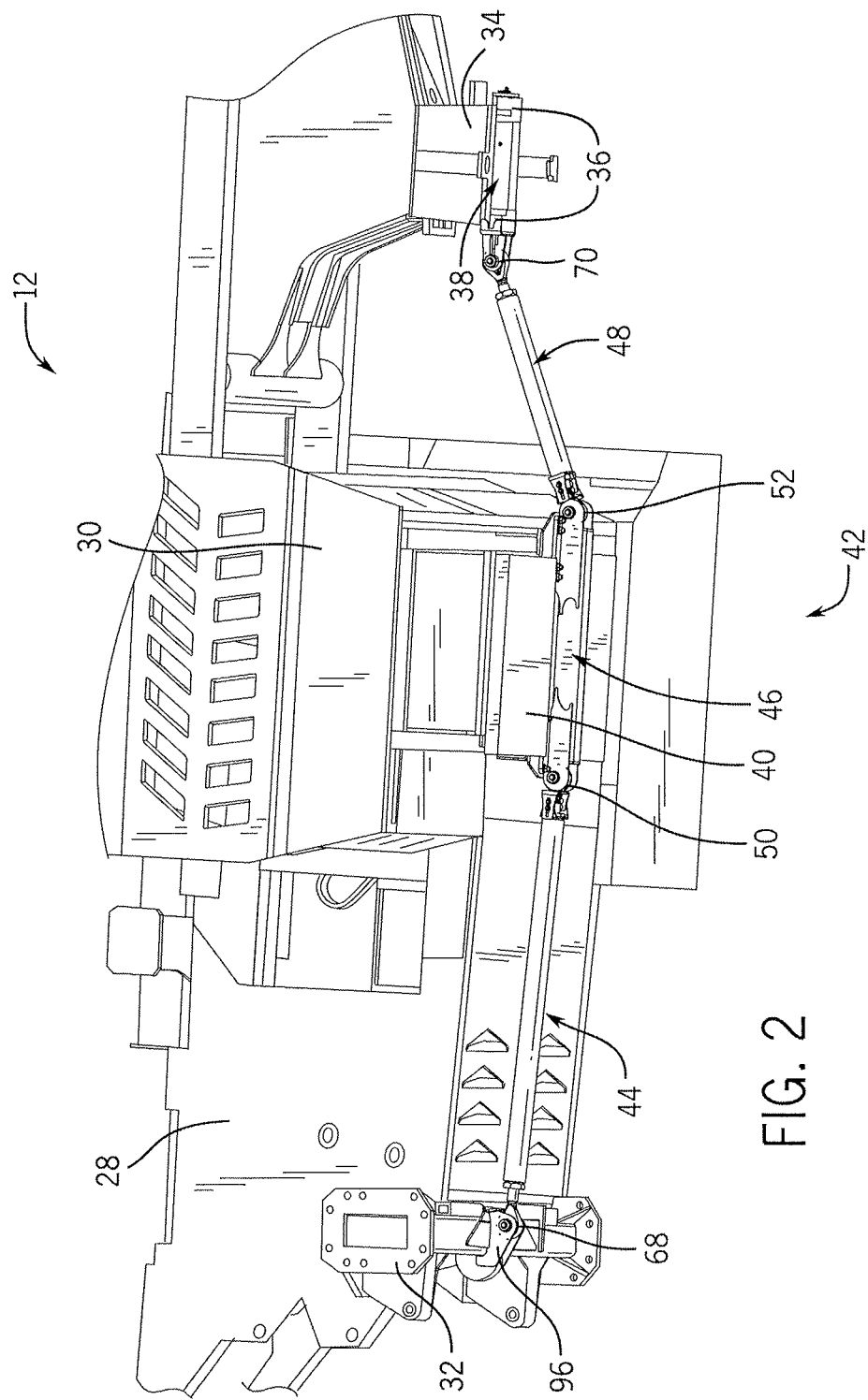
FIG. 2 is a partial perspective view showing a structural beam assembly according to this disclosure attached to the chassis of the agricultural vehicle of FIG. 1.
Figure 3:
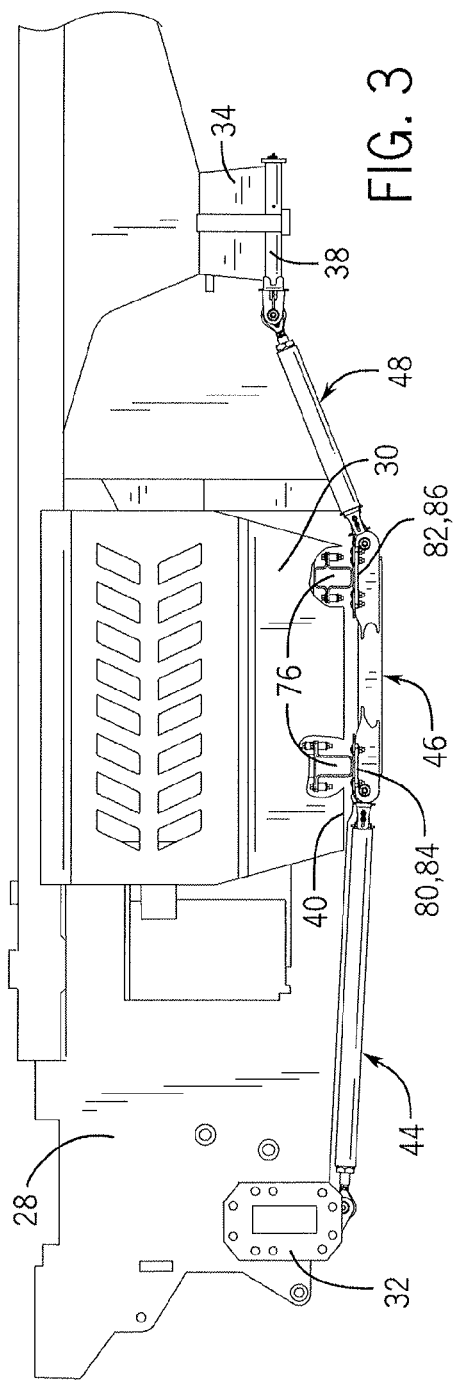
FIG. 3 is a side view thereof.
Figure 4:
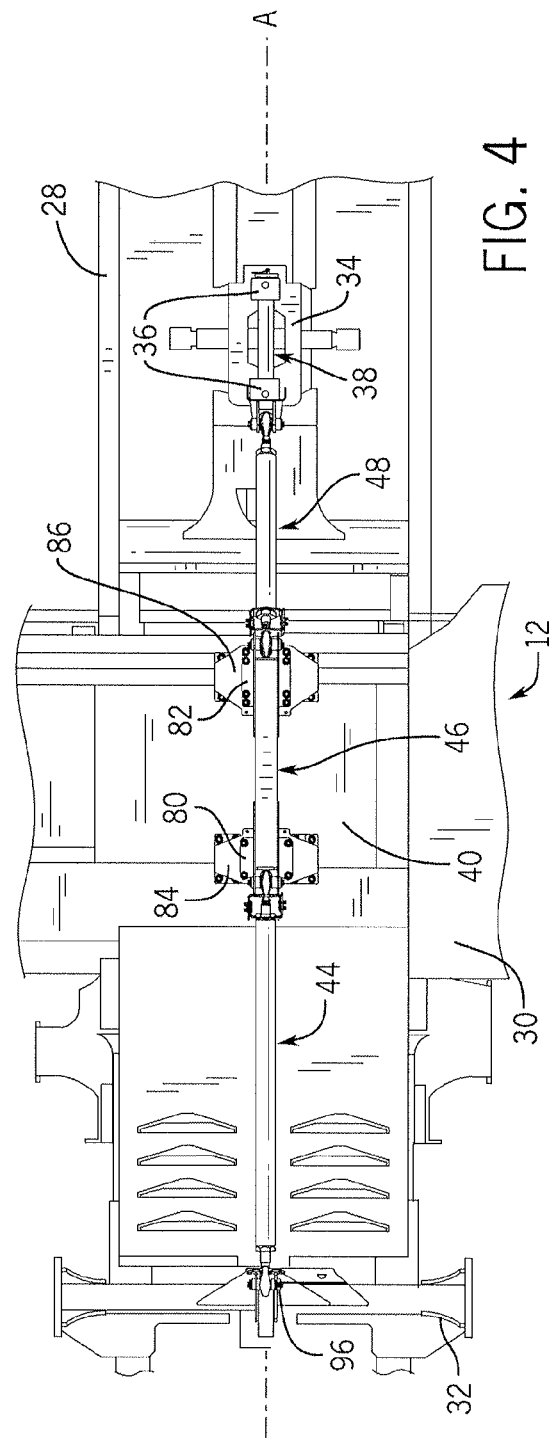
FIG. 4 is a bottom view thereof.
Figure 5:
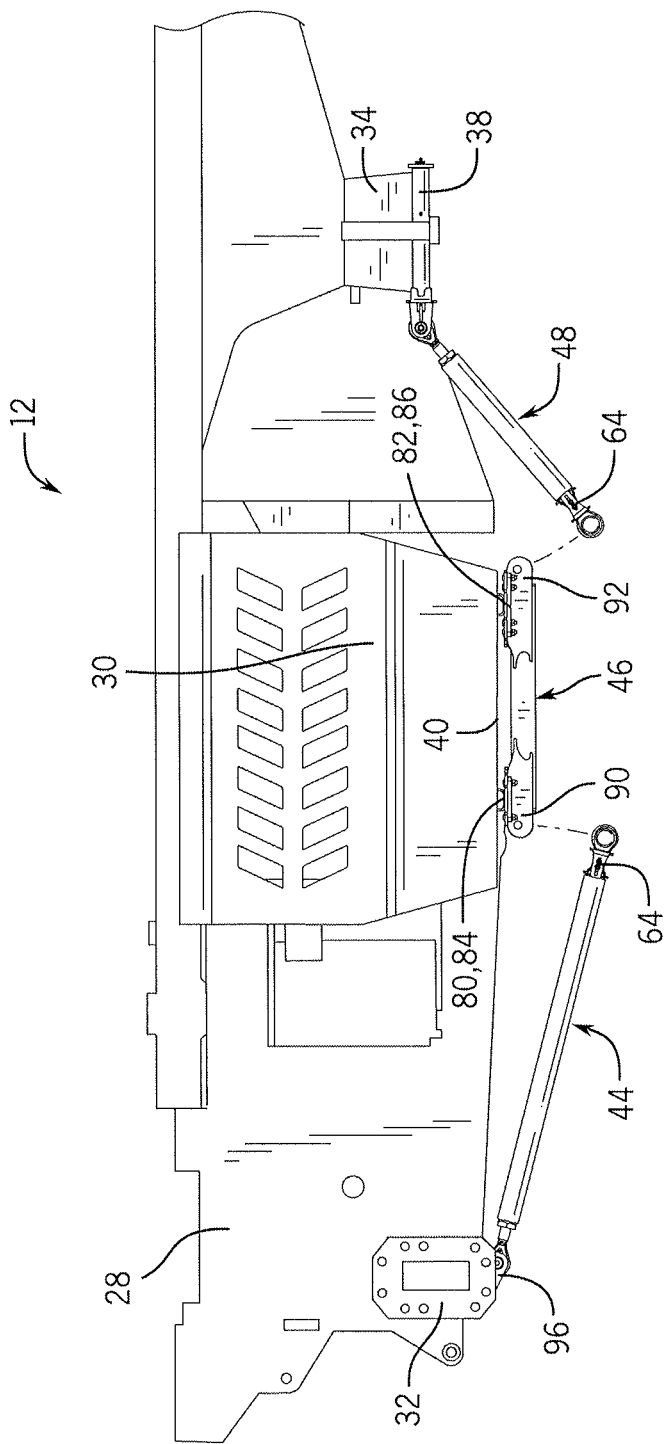
FIG. 5 is a side view showing the structural beam assembly partially detached from the agricultural vehicle of FIG. 1.
Figure 6:
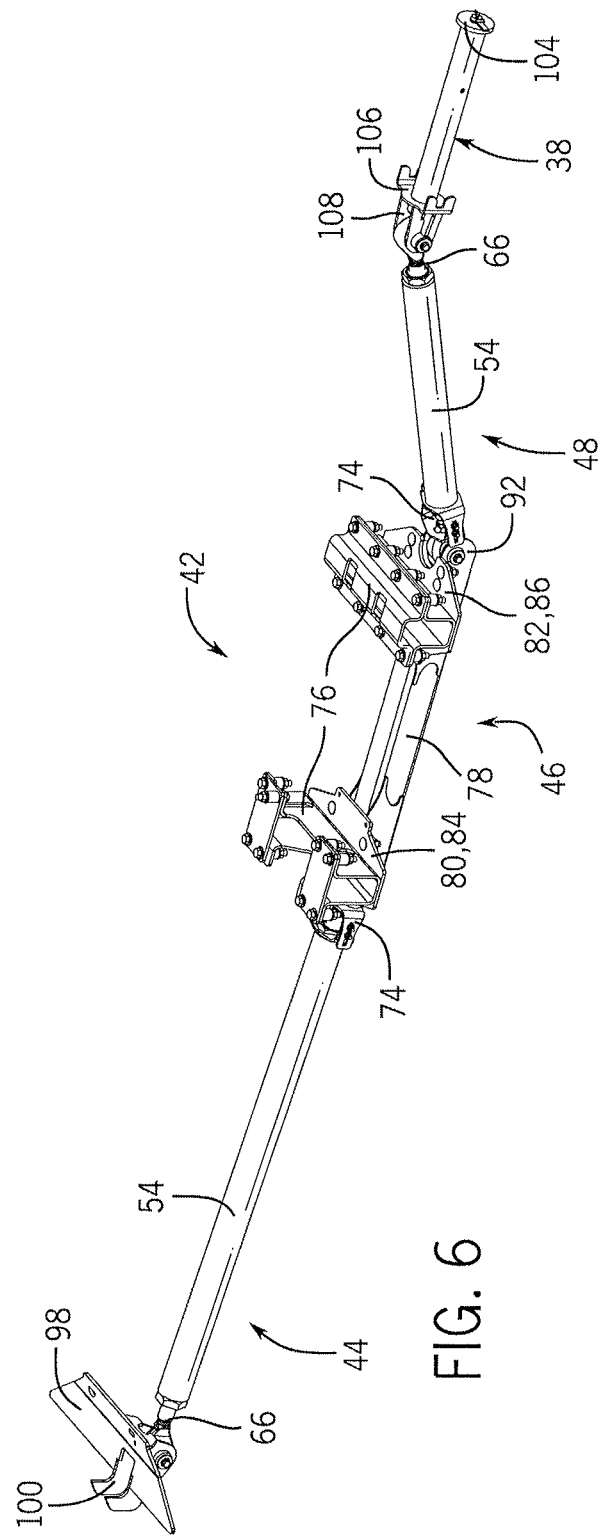
FIG. 6 is a perspective view of the structural beam assembly in isolation.
Figure 7:
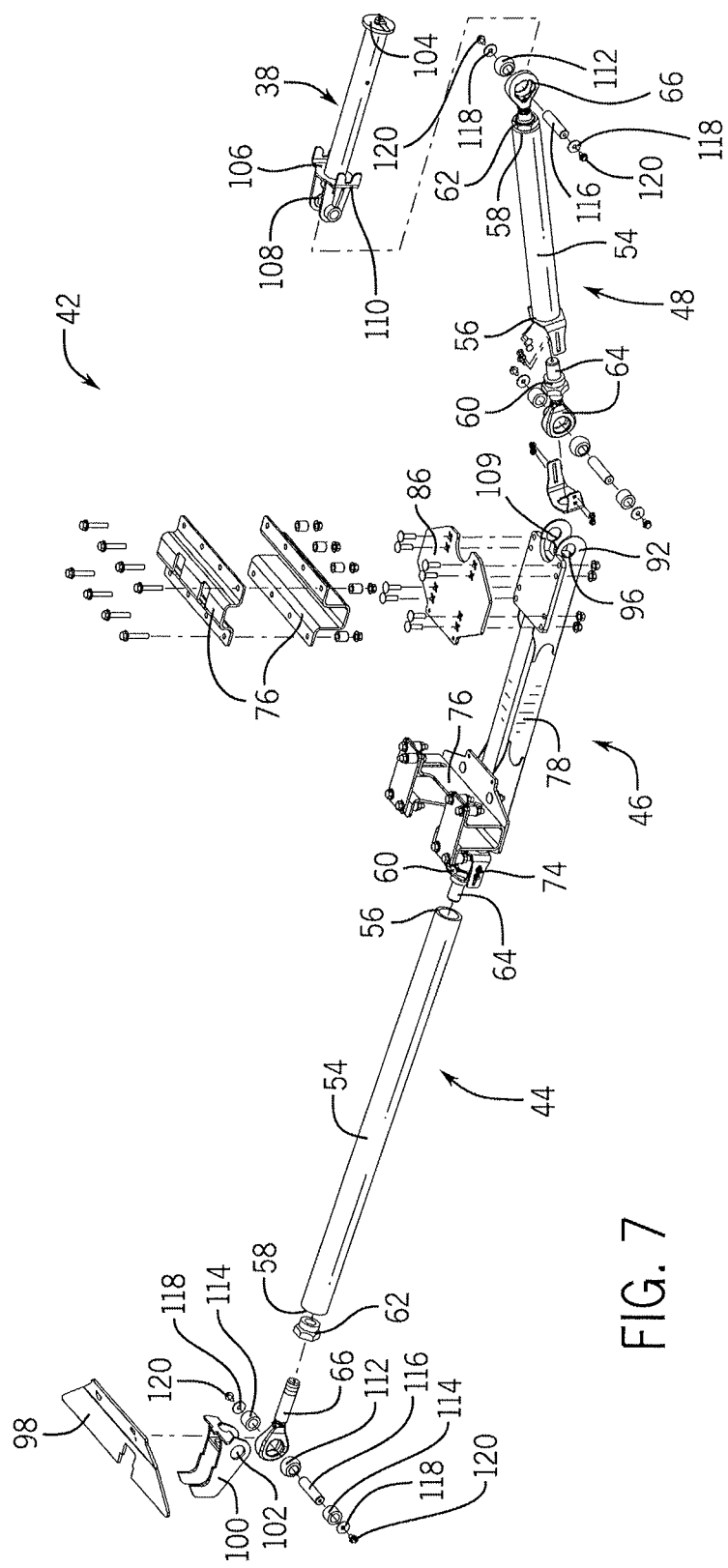
FIG. 7 is an exploded view thereof.
Figure 8:
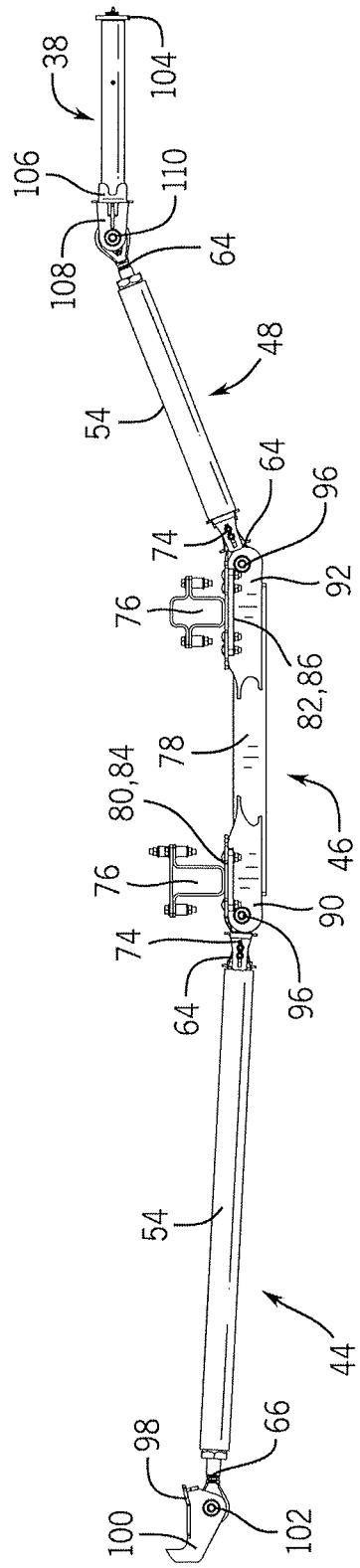
FIG. 8 is a side view thereof.

Referring now to FIGS. 2-4, the chassis 12 of the agricultural vehicle 10 is shown to include a main frame 28, an engine housing 30, a front axle 32 forward of the engine housing 30, and a rear axle (not shown) supported by a rear axle mount 34 rearward of the engine housing 30. The front drive wheels 14 are coupled to, and supported by, the main frame 28 through the front axle 32. The steerable rear wheels 16 are coupled to, and supported by, the main frame 28 through the rear axle (not shown) connected to the rear axle mount 34. The front and rear axles may be made of a rectangular structural tube, and the rear axle mount 34 may be an open box shape having a pair of kingpin mounts 36 for mounting a chassis mount in the form of a kingpin 38. An engine (not shown) for powering the drive train and other systems of the agricultural vehicle 10 may be mounted to the main frame 28 within the engine housing 30 between the axles. A bottom panel 40 of the engine housing 30 may be at least partially removable to provide access to the engine.

Referring also to FIGS. 6-9, a structural beam assembly 42 may be provided to structurally reinforce the chassis 12 of the agricultural vehicle 10. In general, the structural beam assembly 42 may have one or multiple structural beams or beam segments that couple to the chassis 12 at load transfer points in a manner to transfer compressive or tensile loads primarily in the longitudinal direction. Each beam segment includes a structural component having a solid or hollow core, and may be made out a material or materials having good compressive and tensile strength, such as steel, aluminum and various alloys thereof. One or more of the beam segments may be a sub-assembly, which in addition to the structural member, may also have one or more mechanisms for lengthening or shortening the overall length of the individual beam segment and/or the structural beam assembly 42 as a whole.

More specifically, in the illustrated example, the structural beam assembly 42 may have a front beam segment 44, a middle beam segment 46, and a rear beam segment 48. It will be appreciated that more or less than three beam segments may be provided. The segments 44, 46, 48 are coupled together and/or to the chassis 12 by first 50, second 52, third 68 and fourth 70 movable joints. At least one of the beam segments 44, 46, 48 may be an assembly providing for length adjustment for assembly and disassembly and to transfer compression and/or tensile forces between various chassis mounts that tie into the main frame 28. For example, the front 44 and rear 48 beam segments may be adjustable. By vertically separating the structural beam assembly 42 from the chassis 12, the structural beam assembly 42 can better contribute to the rigidity, and bend resistance, of the chassis 12. Also, because the beam segments 44, 46, 48 couple to the chassis 12 (and each other) by the joints 50, 52, 68 and 70, which allow for movement in the non-longitudinal directions, lateral bending moments and other loading may not be transferred between the beam segments 44, 46, 48 to the chassis 12.

The front 44 and rear 48 beam segments may each be sub-assemblies with a main body 54, which is a structural member having a straight, tubular, hollow core construction with opposite ends 56 and 58. End caps 60 and 62 attach to the main body 54 at the respective ends 56, 58 via a suitable technique, such as welding or friction fit, and have threaded bores, which may be threaded in opposite directions. The front 44 and rear 48 beam segments may each have adjustment mechanisms, in the form of eye bolt ball joint members 66 and 68, extending from the ends of the main body 54. The eye ball joint members 66 and 68 may each have an eye opening 72, extending through the eye ball joint members 66 and 68 toward one end and perpendicular to their respective lengths. The eye bolt ball joint members 64, 66 may have opposite (left-hand, right-hand) threading, on the end opposite the eye opening 72, to match the threaded bores of the end caps 60, 62, and thus allow the main body 54 to act as a turnbuckle when rotated relative to the eye bold ball joint members 64, 66, as described below. A rotational lock 74 may be provided for limiting the rotation of the main body 54 relative to at least one of the eye bolt ball joint members 64, 66. The rotational lock 74 may couple on one end to the main body 54 and on the other end to one of the eye bolt ball joint members 64, 66. The rotational lock 74 may prevent relative rotation of the main body 54 and the eye bolt ball joint member 64, 66 to create a rigid connection and to maintain the pre-compression or pre-tension loading.

The middle beam segment 46 may be constructed differently than the front 44 and rear 48 beam segments. The middle beam segment 46 may have a main body 78, such as a structural channel member, with base plates 80 and 82 attached at the front and rear of the main body 78. The base plates 80, 82 may each attach to an associated mounting plate 84 and 86, respectively, through a plurality of fasteners 88 for rigidly coupling the middle beam segment 46 to the main frame 28. The mounting plates 84, 86 may be rigidly mounted, such as through welding to a cross-member (not shown) at the engine housing area of the chassis 12 via engine housing brackets 76. Engine housing brackets 76, via the plates 80-86, contribute to provide two of the chassis mounts that couple the middle beam segment 42 (and thus the structural beam assembly 42) to the chassis. The main body 78 may have a square tube construction with a first pair of flanges 90 and a second pair of flanges 92 extending, respectively, from the front and rear of the main body 78. The flanges 90, 92 may each have a bore 109 extending perpendicular to the length of the middle beam segment 46. The flanges 90 and 92 may form a portion of the joints 50 and 52, respectively.

A front chassis mount may take the form of a front axle bracket 96 having a mounting plate 98 and a pair of parallel flanges 100 attached to the mounting plate 98 via a suitable technique, such as welding, to be generally parallel to each other and perpendicular to the mounting plate 98. The flanges 100 may extend vertically above the mounting plate 98 at a forward location and may extend vertically below the mounting plate 98 along the portion where the flanges 100 attach to the mounting plate 98. The flanges 100 may have coaxial bores 102 for accepting a portion of the front beam segment 44 and forming the third joint 68. Specifically, the front beam segment 44 may be pivotably coupled to the front axle bracket 96 by passing the eye bolt ball joint member 66 between the pair of flanges 100 such that the eye opening 72 aligns with the bores 102. A bushing, or bearing 112, may be inserted into the eye opening 72 and a pair of bushings 114 may be inserted in the bores 102. An axle 116 may be passed through the bearing 112 and the bushings 114 and may be secured to the front beam segment 44 and the front axle bracket 96 using a pair of washers 118 and a pair of fasteners 120 secured on each end of the axle 116 to form the joint 68.

The front beam segment 44 may be pivotably coupled to the middle beam segment 46 through the first joint 50. The eye bolt ball joint member 64 of the front beam segment 44 may be passed between the pair of flanges 90, until the eye opening 72 is aligned with the bores 109. Similar to the third joint 68, the bearing 112 may be inserted into the eye opening 72 and the pair of bushings 114 may be inserted in the bores 109. The axle 116 may be passed through the bearing 112 and the bushings 114 and may be secured to the front beam segment 44 and the front axle bracket 96 using a pair of washers 118 and a pair of fasteners 120 secured on each end of the axle 116 to form the joint 50.

The rear beam segment 48 may be pivotably coupled to the middle beam segment 46 through the joint 52. The eye bolt ball joint member 64 of the rear beam segment 48 may be passed between the flanges 92 until the eye opening 72 is aligned with the bores 109. Similar to the joint 68, the bearing 112 may be inserted into the eye opening 72 and the pair of bushings 114 may be inserted in the bores 109. The axle 116 may be passed through the bearing 112 and the bushings 114 and may be secured to the rear beam segment 48 and the middle beam segment 46 using a pair of washers 118 and a pair of fasteners 120 secured on each end of the axle 116 to form the joint 52.

The rear beam segment 48 may be pivotably coupled to the kingpin 38 through the fourth joint 70. The kingpin 38 may have a rear end plate 104 located toward the rear of the kingpin 38 and a forward end plate 120 located forward of the rear end plate 104 for mounting the kingpin 38 to the rear axle mount 34. The kingpin 38 may have a pair of flanges 108 located forward of the forward end plate 120. The flanges 108 may have bores 110 extending through the flanges 108 in a direction perpendicular to the direction of travel. The eye bolt ball joint member 66 of the rear beam segment 48 may be passed between the kingpin flanges 108 until the eye opening 72 is aligned with the bores 110. The bearing 112 may be inserted into the eye opening 72. The axle 116 may be passed through the bearing 112 and the bushings 114 and may be secured to the rear beam segment 48 and the kingpin 38 using a pair of washers 118 and a pair of fasteners 120 secured on each end of the axle 116 to form the fourth joint 70, and thus part of another chassis mount.

The structural beam assembly 42 is installed by attaching, such as through welding or bolting, the mounting plates 84, 86 to the engine housing brackets 76 with the mounting plates 84, 86 centered in the middle of the agricultural vehicle along the centerline A (see FIG. 4). The base plates 80, 82 may be mounted to the mounting plates 84, 86 through fasteners, with the middle beam segment 46 extending along centerline A. In this configuration, the main body 78 is vertically spaced from the bottom panel 40. The front axle bracket 96 may similarly be attached to the front axle 32 by welding the mounting plate 98 to the bottom side of the front axle 32 such that the flanges 100 wrap partially around the bottom side and front side of the front axle 32. As with the middle beam segment 46 and mounting plates 84, 86, the front beam segment 44 may be centered along the centerline A. The front beam segment 44 may then be coupled to the chassis 12 via chassis mounts or joints 50 and 68. In this configuration, the main body 54 of the front beam segment 44 is also vertically spaced from the main frame 28. The kingpin 38 may be attached to the rear axle mount 34, thus forming a chassis mount, by passing the kingpin 38 through the kingpin mounts 36 until the front end plate 106 abuts against the forward most portion of the kingpin mounts 36. The rear end plate 104 may then be attached to the kingpin 38, such as through welding, to retain the kingpin 38 within the kingpin mounts 36 and to the rear axle mount 34. The rear beam segment 48 may then be coupled to the middle beam segment 46 and the kingpin 38 by creating joints 52, 70 or chassis mounts.

It should be noted that while the structural beam assembly 42 may be arranged with consecutive beam segments and joints/chassis mounts aligned along the vehicle centerline A, the height and vertical orientation need not be co-linear. For example, with reference to FIGS. 1, 2 and 8, the joint 70 may be vertically offset from (e.g., higher than) joint 52. As such, in this example, the rear segment 48 will take an inclined orientation. In other configurations of the structural beam assembly, one or more of the front, middle, rear or other beam segments may take a non-level attitude to more or less of an extent. Thus, the segmented and pivotal construction of the assembly allows for numerous configurations to be constructed that are tailored to the particular undercarriage or other chassis frame configurations of various vehicle platforms.

The beam segments should be spaced from the chassis frame in the plane in which the bending occurs so that the structural beam assembly 42 will work as a moment arm acting counter to the bending of the chassis 12. For example, the illustrated configuration has the three beam segments 44, 46, 48 spaced vertically from the main frame 28 to counteract the fore-aft bend-inducing load on the main frame 28. The spacing allows the tensile or compressive forces in the beam segments 44, 46, 48, and thereby the structural beam assembly 42 overall, to apply a moment load on the main frame 28 in the rotational direction opposite to the bend-inducing load acting on the main frame 28. For example, if the front drive wheels 14 were to encounter an obstruction or inclined terrain, the forces acting, for example in a generally upward direction as viewed from FIG. 1, on the front axle 32 may tend to create a clockwise moment load on the main frame 28 (as viewed from FIG. 1). Since the structural beam assembly 42 is mounted below the chassis 12, the assembly, or at least the front beam segment 44, which would be subjected to tensile loading, would tend to resist the clockwise bending (or moment load) by applying a countering moment in the counter-clockwise direction (as viewed from FIG. 1).

Moreover, in the three-segment configuration illustrated, the additional rigidity provided by the structural beam assembly 42 may transfer fore-aft loads between the front axle 32 and the engine housing brackets 76 through the joints 68, 50 and through the front beam segment 44. Similarly fore-aft loads may be transferred between the rear axle mount 34 and the engine housing brackets 76 through the joints 70, 52 and through the rear beam segment 48. Fore-aft loads may also be transferred between the front and rear engine housing brackets 76 through the middle beam segment 46.

As mentioned, the length of the adjustable beam segments, such as the front 44 and the rear 48 beam segments, may be adjusted to take extra overall length, or slack, out of the structural beam assembly 42 when it is attached to the chassis 12 (and to create a pre-load tension load), or to alternatively add additional overall length (and to create a pre-load compression load). For example, the front 44 and rear 48 beam segments may be rotated in a first direction, such as clockwise, to increase the overall length of the beam segments 44 and 48, or may be rotated in a second direction, such as counter clockwise, to decrease the overall length. Since, the eye bolt ball joint members 64, 66 are rotationally fixed by the first 50, second 52, third 68 and fourth 70 joints, rotating the main body 54 rotates the main body 54 relative to the eye bolt ball joint members 64, 66. Due to the opposite threading, the eye bolt ball joint members 64, 66 move outward or inward relative to the main body 54 depending on the direction of the rotation, causing the overall length of the front 44 and/or rear 48 beam segments to increase or decrease. If either or both of the front 44 and rear 48 beam segments is pre-tensioned, then the tensioned beam segment or the entire assembly may better work to counteract the compressive forces transferred to the structural beam assembly 42. Conversely, if one or both of the front 44 and rear 48 beam segments structural beam assembly 42 is pre-compressed, then compressed beam segment of the entire assembly may better work to counteract the tensile forces transferred to the structural beam assembly 42. In either case, the structural beam assembly 42 may then better rigidify or otherwise augment the structural integrity of the chassis 12 to better withstand longitudinal bend-inducing loads. It should be noted that one of the beam segments 44, 48 may be pre-compressed while the other beam segment 44, 48 may be pre-tensioned.

Figure 9:
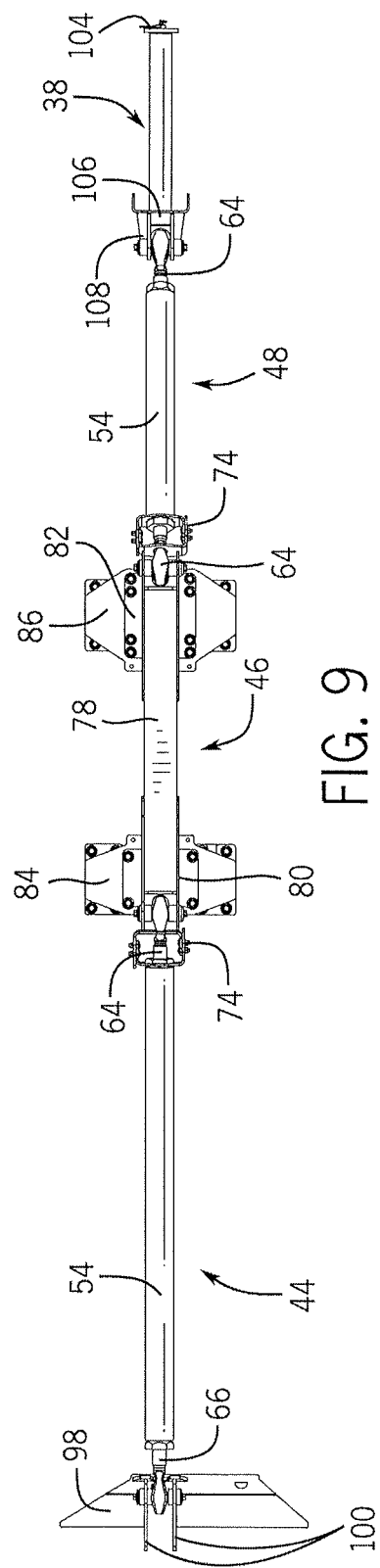
FIG. 9 is a bottom view thereof.

Referring to FIG. 9, in the event the maintenance is needed in areas near (above or below) where the structural beam assembly 42 is mounted, for example to access the engine in the engine housing 30, the structural beam assembly 42 may be partially disassembled and/or dismounted. The front beam segment 44 may be decoupled from the engine housing 30 by removing the fasteners 120 coupling the flanges 90 of the middle beam segment 46 with the eye bolt ball joint member 64, thus decoupling the joint 68. Similarly, the rear beam segment 48 may be decoupled from the engine housing 30 by removing the fasteners 120 that couple the flanges 92 of the middle beam segment 46 with the eye bolt ball joint member 64, thus decoupling the fourth joint 70. The middle beam segment 46 may be partially removed from the cotton picker 10 by detaching the fasteners coupling the base plates 80, 82 to the mounting plates 84, 86. The bottom panel 40 of the engine housing 30 can thus be opened or removed to access the engine. If, for example, the engine needed to be dismounted, a machine (e.g., a lift or fork truck) may be used to support and remove the engine.

It will be appreciated that in other configurations of the structural beam assembly one or more of the beam segments may have different constructions. As one non-limiting example, one or more of the beam segments of the structural beam assembly 42 may include pneumatic or hydraulic pistons to extend and retract the length of individual beam segments or the overall assembly. In such case, adding additional air or hydraulic fluid pressure to the front 44 and/or rear 48 beam segments would cause the front 44 and/or the rear 48 beam segments to increase in overall length, while removing air or hydraulic fluid would cause the front 44 and/or the rear 48 beam segments to decrease in overall length. In other examples, the adjustment mechanisms may be in the form of shims that may be inserted onto to the beam segments to increase their overall length, or an axial screw or cam in the beam segments that may be rotated to increase their overall length.

In other examples, a plurality of structural beam assemblies 42 may be provided. For example, two structural beam assemblies 42 may be provided parallel to one another, and offset from the centerline A in the side-to-side direction. If multiple structural beam assemblies 42 are provided, then the lateral spacing between the beam segments may be equal or may be different based on the stresses realized by the chassis 12. Also, if a plurality of structural beam assemblies 42 are provided, some of the components may be shared, for example, the front bracket 96 may have a single mounting plate 98 and may have a pair of flanges 100 for connecting to each front beam segment 44 of the plurality of structural beam assemblies 42.

In still other examples, a plurality of nonparallel structural beam assemblies 42 may be provided. If the structural beam assemblies 42 are not parallel, then the structural beam assemblies 42 may not extend purely in the longitudinal direction along the entire length of the structural beam assembly 42. For example, the front 44 and the rear 48 beam segments may extend at an angle relative to the direction of travel, while the middle beam segment 46 may extend in the direction of travel. Additionally, the plurality of structural beam assemblies 42 may share some components, for example, if two structural beam assemblies 42 are provided, there may be two front 44 and two rear 48 beam segments, but there may only be one middle beam segment 46. Other configurations are possible, such as providing two front beam segments 44 and one middle 46 and one rear 48 beam segments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, components, operations, or arrangements, but do not preclude the presence or addition of one or more other features, components, operations or arrangements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A chassis augmentation assembly for an agricultural vehicle with a chassis having a main frame supporting a front axle and a rear axle spaced apart along a longitudinal centerline of the vehicle, the assembly comprising:
    first and second chassis mounts attached to the vehicle chassis and longitudinally spaced apart at first and second chassis locations; and
    a beam assembly having at least one structural beam segment vertically spaced from the main frame, the beam assembly having a first end and a second end spaced apart longitudinally such that the first end is coupled to the vehicle chassis via the first chassis mount and the second end is coupled to the vehicle chassis via the second chassis mount, the beam assembly configured to transfer longitudinal chassis load forces between the first and second chassis locations through the first and second chassis mounts and the at least one structural beam segment.

2. The assembly of claim 1, wherein the at least one structural beam segment has an overall length that is adjustable.

3. The assembly of claim 1, wherein the first and second chassis mounts provide a movable connection of the beam assembly to the vehicle chassis in one or more directions other than the longitudinal dimension.

4. The assembly of claim 1, wherein the beam assembly includes a plurality of structural beam segments.

5. The assembly of claim 4, wherein the plurality of structural beam segments includes at least three beam segments serially coupled to one another.

6. The assembly of claim 4, wherein the plurality of structural beam segments includes a front beam segment and a rear beam segment;
    wherein the front beam segment is coupled at a front end to the first chassis mount at the first chassis location and the rear beam segment is coupled at a rear end to the second chassis mount at the second chassis location, the rear beam segment being structurally coupled at a front end to a rear end of the front beam segment so as to transfer longitudinal chassis load forces between the front and rear beam segments.

7. The assembly of claim 6, wherein the plurality of structural beam segments further includes a middle beam segment coupled to the front and rear beam segments.

8. The assembly of claim 7, wherein the beam assembly includes first and second pivot connections joining opposite ends of the middle beam segment to the front and rear beam segments.

9. The assembly of claim 1, wherein the at least one beam segment of the beam assembly extends along the longitudinal centerline of the vehicle.

10. A chassis augmentation assembly for an agricultural vehicle with a chassis having a main frame supporting a front axle and a rear axle spaced apart along a longitudinal centerline of the vehicle, the assembly comprising:
   a first chassis mount attached to the vehicle chassis proximate the front axle and a second chassis mount attached to the vehicle chassis proximate the rear axle; and
   a front beam segment coupled at a front end to the first chassis mount and a rear beam segment coupled at a rear end to the second chassis mount, the rear beam segment being structurally coupled at a front end to a rear end of the front beam segment so as to transfer longitudinal chassis load forces between the first and second chassis mounts through front and rear beam segments;
   wherein an overall length of at least one for the front and rear beam segments is adjustable.

11. The assembly of claim 10, further including a middle beam segment coupled to the front and rear beam segments.

12. The assembly of claim 11, further including first and second pivot connections joining opposite ends of the middle beam segment to the front and rear beam segments.

13. An agricultural vehicle, comprising:
   a chassis having a main frame extending along or parallel to a longitudinal centerline of the vehicle and supporting a front axle and a rear axle spaced apart longitudinally along centerline from the front axle;
   first and second chassis mounts attached to the vehicle chassis and longitudinally spaced apart at first and second chassis locations; and
   a beam assembly having at least one structural beam segment vertically spaced from the main frame, the beam assembly having a first end and a second end spaced apart longitudinally such that the first end is coupled to the vehicle chassis via the first chassis mount and the second end is coupled to the vehicle chassis via the second chassis mount, the beam assembly configured to transfer longitudinal forces between the first and second chassis mounts through the at least one structural beam segment.

14. The vehicle of claim 13, wherein the at least one structural beam segment has an overall length that is adjustable.

15. The vehicle of claim 13, wherein the first and second chassis mounts provide a movable connection of the beam assembly to the vehicle chassis in one or more directions other than the longitudinal dimension.

16. The vehicle of claim 13, wherein the beam assembly includes a plurality of structural beam segments.

17. The vehicle of claim 16, wherein the plurality of structural beam segments includes at least three beam segments serially coupled to one another.

18. The vehicle of claim 16, wherein the plurality of structural beam segments includes a front beam segment and a rear beam segment;
   wherein the front beam segment is coupled at a front end to the first chassis mount at the first chassis location and the rear beam segment is coupled at a rear end to the second chassis mount at the second chassis location, the rear beam segment being structurally coupled at a front end to a rear end of the front beam segment so as to transfer longitudinal forces between the front and rear beam segments.

19. The vehicle of claim 18, wherein the plurality of structural beam segments further includes a middle beam segment coupled to the front and rear beam segments.

20. The vehicle of claim 19, wherein the beam assembly includes first and second pivot connections joining opposite ends of the middle beam segment to the front and rear beam segments.

* * * * *